United States Patent [19]
Bernoville et al.

[11] Patent Number: 5,759,097
[45] Date of Patent: Jun. 2, 1998

[54] AIR EXTRACTOR VALVE

[75] Inventors: Jean Claude Bernoville, Le Loroux-Bottereau; Frederic Jacq, Nantes; Thierry LeBras, Nantes; Jean Payerne, Nantes; Alain Peyrie, Reze; Fabrice Roche, Colomban, all of France

[73] Assignee: Draftex Industries Limited, Edinburgh, Scotland

[21] Appl. No.: 604,217

[22] Filed: Feb. 20, 1996

[30] Foreign Application Priority Data

Feb. 22, 1995 [GB] United Kingdom ............ 9503490

[51] Int. Cl.$^6$ .................................................. B60H 1/24
[52] U.S. Cl. .................... 454/162; 137/855; 137/512.1
[58] Field of Search .............................. 454/162, 164, 454/165; 137/855, 856, 512.1

[56] References Cited

U.S. PATENT DOCUMENTS 5,105,849  4/1992  Clough ............................ 137/512.15
5,194,038  3/1993  Klomhaus et al. ................... 454/162
5,263,895  11/1993  Kraus et al. .
5,355,910  10/1994  Gies et al. ........................... 137/858

FOREIGN PATENT DOCUMENTS 2170900  2/1985  United Kingdom .

*Primary Examiner*—Harold Joyce
*Assistant Examiner*—Derek S. Boles
*Attorney, Agent, or Firm*—Leydig, Voit & Mayer, Ltd

[57] ABSTRACT

An air extraction valve and grill assembly for mounting in an opening in the bodywork of the passenger compartment of a vehicle body, and for enabling the extraction of stale air from the passenger compartment, is molded from the rigid thermoplastic material and defines two air extraction apertures. Each aperture is controllably closed off by a valve flap. Each valve flap is molded from rigid thermoplastics material, or produced from other similar rigid material. Onto each valve flap are over-molded two strips of thermoplastic material. One of these strips forms a hinge for supporting the valve flap in the aperture and biassing it into a position where the other over-molded strip acts as a seal with the rigid body of the assembly.

14 Claims, 3 Drawing Sheets

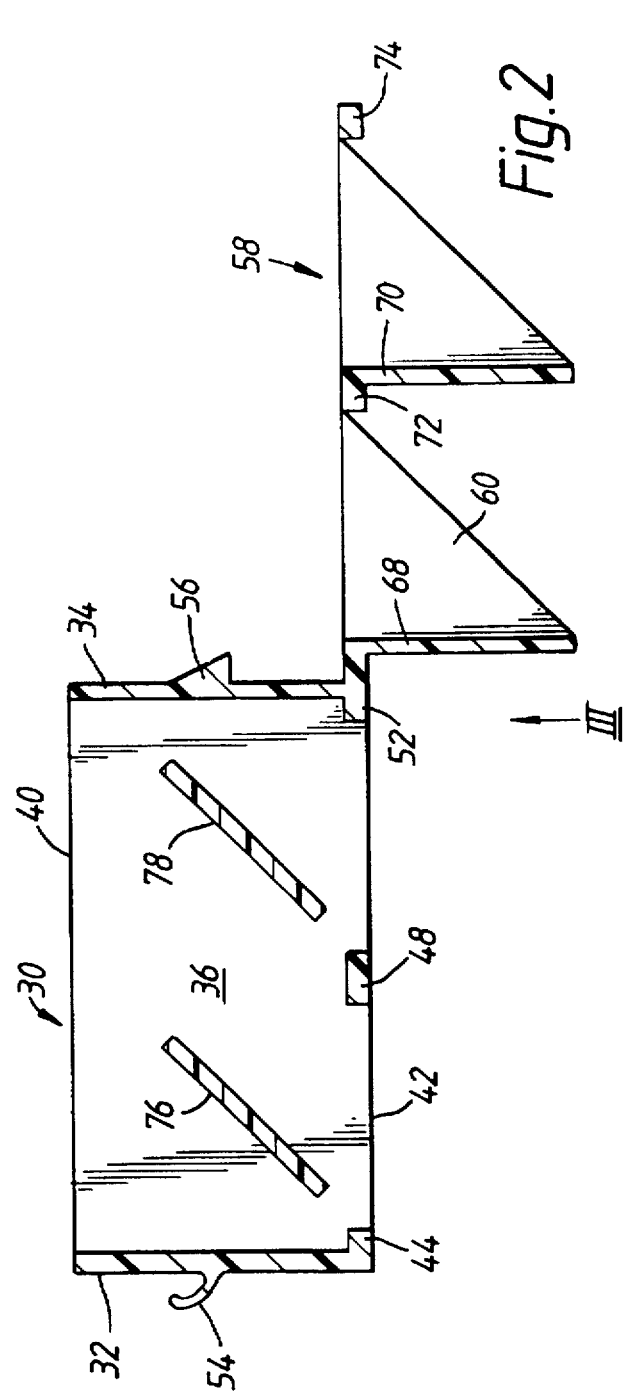
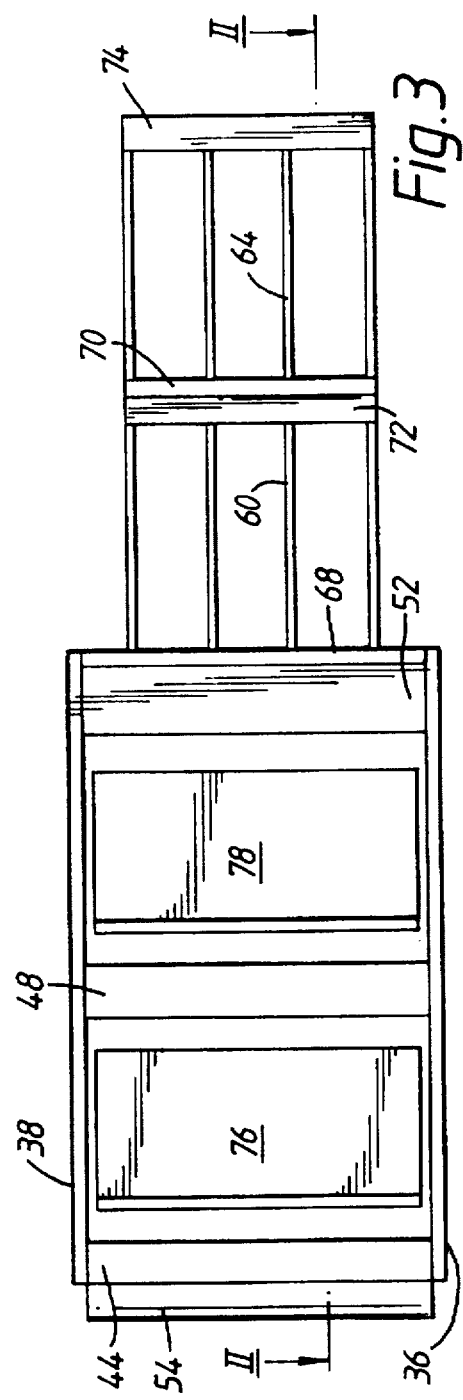

AIR EXTRACTOR VALVE

BACKGROUND OF THE INVENTION

The invention relates to an air extractor valve assembly, comprising a rigid body moulded from thermoplastic material and providing a frame defining at least one air extraction aperture, and a valve flap hingedly mounted on the frame for sealingly closing off the aperture but openable to allow an extracting flow of air therethrough.

One known form of such assembly is for fitting in the bodywork of a vehicle body to permit the extraction of air from the inside of the passenger compartment. It is normal to mount one or more such assemblies, or air extractor valves, in the rear part of the passenger compartment of a vehicle body, these valves automatically opening as the pressure within the passenger compartment increases due to the inflow of fresh air, the opening valves allowing the escape of stale air. Such air extractor valves may be incorporated into grills mounted in the bodywork. Such known forms of assembly are difficult and expensive to manufacture because of the relatively complex operations required to provide the hinge and seal for the valve flap. The invention aims to deal with this problem.

BRIEF SUMMARY OF THE INVENTION

According to the invention, the known form of assembly is characterised in that the valve flap is hingedly attached to the frame by a first strip of resilient and flexible thermoplastic material and a second strip of resilient and flexible thermoplastic material acts as a seal between the valve flap and the frame, the first and second strips of resilient material being produced by an over-moulding operation.

BRIEF DESCRIPTION OF DRAWINGS

Air extractor valve and grill assemblies embodying the invention, and for use in a motor vehicle body, will now be described, by way of example only, with reference to the accompanying diagrammatic drawings in which:

FIG. 2 is a cross-section through another of the assemblies at an initial stage in a moulding operation, and taken on the line II—II of FIG. 3;

FIG. 3 is a view in the direction of the arrow III of FIG. 2;

DESCRIPTION OF PREFERRED EMBODIMENTS

Figure 1:
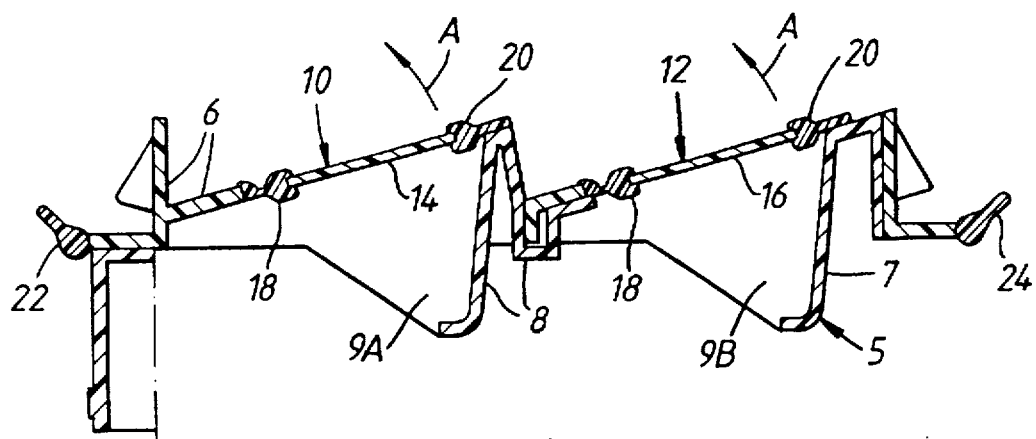
FIG. 1 is a cross-section through one of the assemblies.

The valve and grill assembly shown in FIG. 1 is moulded from rigid plastics material and is of box-like form 5. It has end walls 6 and 7 and an intermediate cross-wall 8. One side wall having two portions 9A and 9B is shown in the Figure. The opposite side wall is not visible. The top and bottom of the box structure 5 are open. However, the top is closed off by flap valves 10,12.

In accordance with a feature of the valve and grill assembly being described, the flap valves 10,12 are each made from a flap of rigid plastics material 14,16 or from other suitable material such as material from which the bodywork trim of the vehicle is manufactured. Each flap 14,16, is provided with two strips 18,20 of thermoplastic material which are over-moulded onto opposite longitudinally extending parallel edges of the flap 14,16. The over-moulded thermoplastic material is flexible and resilient. The strips 18 act as hinges for the flaps 14,16. The strip 18 of flap 14 is secured by suitable means to the end wall 6 while the strip 18 of the flap 16 is similarly secured to the intermediate wall 8. As shown, each strip 18 has a narrowed central portion which enables the strip to flex and thus permits the valve flaps 14,16 to move in the direction of the arrows A and in the reverse direction.

The over-moulded strips 20 are also flexible and resilient. They provide lip portions which sealingly contact the intermediate wall 8 and the end wall 7. They also extend around the remainder of the periphery of the valve flaps.

The rigid material of the valve and grill assembly also has sealing lips 22,24 over-moulded onto it from resilient and flexible thermoplastic material. The lips 22,24 seal the assembly into an appropriately sized aperture in the vehicle bodywork. Preferably, the assembly is arranged to be clipped into position in this aperture by means of suitable fixtures not shown in FIG. 1. Any suitable fixture means may be used, such as clips, screw fixtures, adhesive or rivetting. The lips 22,24 thus provide air and water tight sealing around the periphery of the aperture.

The over-moulding of the strips 18,20 and the lips 22,24 may be carried out by bi-injection, by means of a rotatable mould, by transfer to a second mould, or by any other suitable means.

In use, a build-up of pressure within the passenger compartment, due to the inflow of external air through the heating or air-conditioning system of the vehicle, causes the valve flaps 14,16 to hinge outwardly in the direction of the arrows A so as to allow the escape of air to the outside of the vehicle. When the pressure within the vehicle reduces, the valve flaps 14,16 return under the resilience of the hinge strips 18, in the opposite direction and thus into the positions shown in the Figure. They therefore seal off the interior of the vehicle again and preventing ingress of rain and the like.

Another of the assemblies will now be described with reference to FIGS. 2 to 5. The assembly of FIGS. 2 to 5 is moulded in substantially a operation from two-stage rigid thermoplastic material.

The initial stage of the moulding operation produces the structure shown in FIGS. 2 and 3. This produces a box-like part 30 having sides 32,34,36 and 38, an open top 40 and an open bottom 42. The bottom 42 is crossed by integrally moulded struts 44,48 and 52.

A clip 54 is integrally moulded onto the side 32 and a shoulder 56 is integrally moulded onto the side 34.

The box 30 is integrally moulded with a structure indicated generally at 58 which comprises generally triangular-shaped spaced apart intermediate longitudinally extending wall portions 60 and transverse walls 68 and 70. The structure 58 is also provided with struts 72 and 74.

In addition, the initial stage of the moulding operation produces valve flaps 76 and 78.

Figure 4:
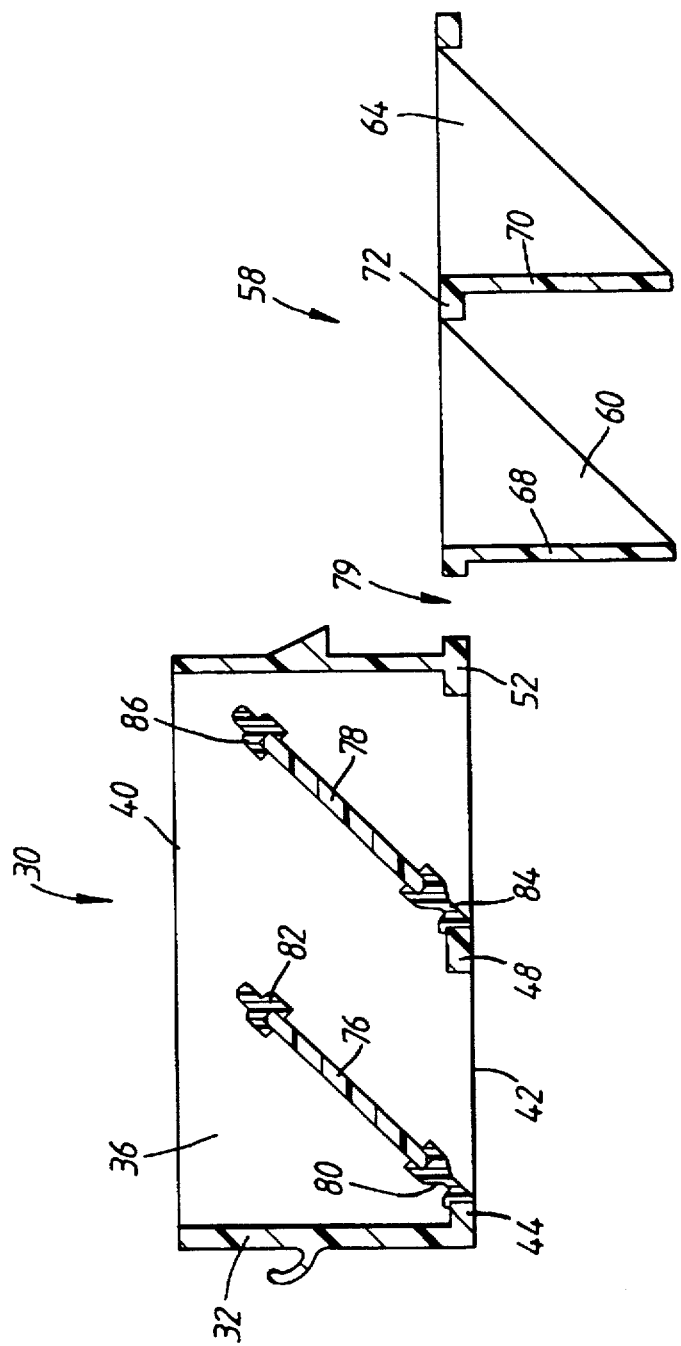
FIG. 4 is a view corresponding to FIG. 2 showing a later stage in the moulding operation.

The second stage of the manufacturing process is illustrated in FIG. 4. As shown here, the structure 58 is separated from the box 30 at 79. The box 30 is then subjected to an over-moulding process which over-moulds strips of resilient and flexible thermoplastic material 80,82,84 and 86 along the edges of the valve flap 76 and 78. The flexible strips 80,84 integrally join the valve flaps 76 and 78 to the struts 44 and 48.

In addition, the over-moulding process over-moulds sealing strips 88,90 onto the external edges of the cross struts 44 and 52.

Figure 5:
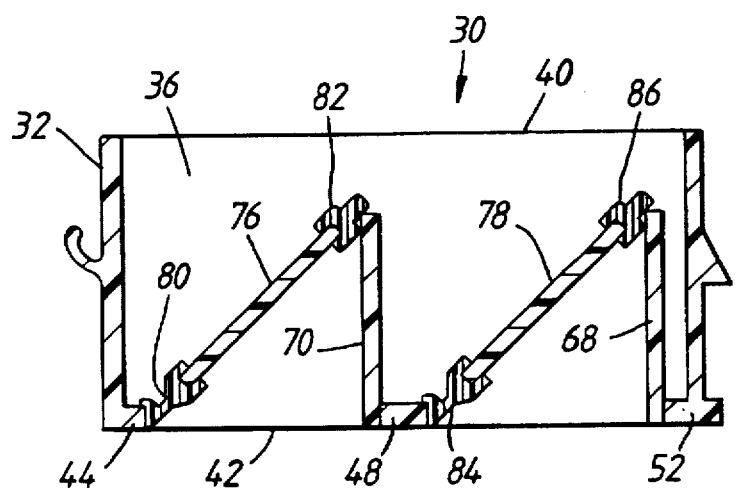
FIG. 5 is a view showing the assembly at a final stage in its manufacture.

Finally, the structure 58 is inserted through the open bottom 42 of the box 30, as shown in FIG. 5. An overall structure of the general form of that shown in FIG. 1 is thus produced, the flaps 76 and 78 being hingeably secured to the struts 44,48 by the over-moulded strips 80,84 of the flexible thermoplastic material. As before, the over-moulded strips 82,86 act as seals. The wall portions 60 support the flaps 76,78 in their closed positions.

The structure of FIG. 5 is fitted into position on the vehicle bodywork by partially inserting it through a suitably placed aperture which has a slot running alongside it for hingeably receiving the hooked portion 54. The structure is then hinged fully into the aperture so as to become firmly held in position by engagement of the shoulder 56 with the edge of the aperture.

Although the flaps 14,16 of FIG. 1 and 76,78 of FIGS. 2–5 have been stated to be made from rigid material, they can instead be made from flexible material. The flexible material is supported by the wall portions 60 in the closed position.

In a modification, the over-moulded strips 18,80,82,84,86 need not all be over-moulded onto the material of the flaps 14,16,76,78. Instead, some or all of the strips 18,80,82,84,86 can be over-moulded onto the adjacent material of the box structure 5,30 which defines the frame of the aperture in which the respective flap is positioned.

In a further modification, however, the flaps (e.g. the flaps 14,16 in FIG. 1 and the flaps 76 and 78 in FIGS. 2–5) can be made of metal instead of being moulded from thermoplastic material. The flexible strips 18,20, or 80,82,84 and 86 would still be provided by over-moulding in the manner explained.

The valve and grill assemblies are advantageous in that they incorporate only a small number of parts, which can be produced by moulding processes. They are thus advantageous as compared with assemblies in which the flap valves are made of strips of rubber or similar material which have to be cut to size and then secured to the body of the grill around the openings with suitable fixtures. The assemblies described and illustrated provide improved sealing and reduced noise compared with known extractor grill assemblies. In addition, they are easily recyclable. Reduced cost and improved quality and appearance are achieved, and the assemblies are easily fitted in position.

What is claimed is:

1. An air extractor valve assembly, comprising
   a rigid body moulded from thermoplastic material and providing a frame defining at least one air extraction apeture,
   a valve flap hingedly mounted on the frame for sealingly closing off the aperture but openable to allow an extracting flow of air therethrough,
   a first strip of resilient and flexible thermoplastic material hingedly attaching the valve flap to the frame, and
   a second strip of resilient and flexible thermoplastic material positioned between and acting as a seal between the valve flap and the frame,
   the first and second strips of resilient material being produced by an over-moulding operation.

2. An assembly according to claim 1, in which at least one of the first and second strips is over-moulded onto the material of the valve flap.

3. An assembly according to claim 2, in which one of the first and second strips is over-moulded onto the material of the valve flap and the other of them is over-moulded onto the material of the frame.

4. An assembly according to claim 2, in which both the first and second strips are over-moulded onto the material of the valve flap.

5. An assembly according to claim 1, in which the first and second strips are over-moulded onto the material of the frame.

6. An assembly according to claim 1, in which the valve flap is moulded from rigid thermoplastic material.

7. An assembly according to claim 1, in which the valve flap is moulded from flexible thermoplastic material and the aperture includes at least one support extending thereacross for supporting the flap in its closed position.

8. An assembly according to claim 1, for mounting in the bodywork of the passenger compartment of a motor vehicle, which is sized to clippingly fit into an opening provided in the bodywork.

9. An assembly according to claim 8, including sealing means made of resilient and flexible thermoplastic material over-moulded onto an external edge of the rigid body for providing a substantially air-tight seal between the assembly and the edge of the opening in the vehicle bodywork.

10. An assembly according to claim 1, in which all of it except the first and second strips is moulded in an initial stage of a two-stage moulding operation, the second stage of which is the over-moulding operation, the over-moulding operation forming the first strip onto the valve flap and also forming the first strip onto the frame.

11. An air extractor grill assembly, for mounting in the external bodywork of the passenger compartment of a vehicle, comprising:
    a rigid body defining a plurality of air extraction apertures each having a respective frame;
    grill means providing a plurality of supports extending across each aperture;
    a respective valve flap for each aperture;
    all the foregoing parts being moulded at substantially the same time from thermoplastics material in an initial stage of a two-stage moulding operation;
    a respective first strip hingedly connecting each valve flap to the frame of its respective aperture and allowing the valve flap to hinge on the frame between an open position in which the aperture is open to allow an extracting flow of air therethrough and a closed position in which the aperture is closed; and
    a respective second strip acting as a seal between each valve flap and its frame when the valve flap is in the closed position;
    the first and second strips being formed at substantially the same time by an over-moulding operation which is carried out after the initial stage of the moulding operation and which forms the second stage of the moulding operation.

12. An assembly according to claim 11, in which at least one of the first and second strips is over-moulded onto the material of each valve flap.

13. An assembly according to claim 11, in which at least one of the first and second strips is over-moulded onto the material of the frame of each aperture.

14. An assembly according to claim 11, including sealing means made of resilient and flexible thermoplastic material over-moulded onto an external edge of the rigid body for providing a substantially air-tight seal between the body and the vehicle bodywork.

* * * * *